(12) United States Patent
Sasaki (10) Patent No.: US 10,466,995 B2
(45) Date of Patent: *Nov. 5, 2019

(54) SELECTIVE SOFTWARE DISTRIBUTION FOR AN INDUSTRIAL PLANT

(71) Applicant: CANON KABUSHIKI KAISHA, Tokyo (JP)

(72) Inventor: Masatoshi Sasaki, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/592,311

(22) Filed: May 11, 2017

(65) Prior Publication Data

US 2017/0242684 A1    Aug. 24, 2017

Related U.S. Application Data

(63) Continuation of application No. 14/355,228, filed as application No. PCT/JP2012/007706 on Nov. 30, 2012, now Pat. No. 9,665,361.

(30) Foreign Application Priority Data

Dec. 13, 2011   (JP) ................................ 2011-272292

(51) Int. Cl.
  *G06F 8/65*      (2018.01)
  *G05B 19/042*   (2006.01)
  (Continued)

(52) U.S. Cl.
  CPC .......... *G06F 8/65* (2013.01); *G05B 19/0426* (2013.01); *G05B 19/056* (2013.01);
  (Continued)

(58) Field of Classification Search
  CPC ..... G06F 8/65; G06F 8/61; G06F 8/60; G06F 16/23
  See application file for complete search history.

(56) References Cited

U.S. PATENT DOCUMENTS 5,517,639 A * 5/1996 Yamaguchi ......... G06F 11/3419
                                                              377/16
7,080,371 B1    7/2006 Arnaiz et al.
(Continued)

FOREIGN PATENT DOCUMENTS

DE       10236801 A1    3/2004
EP        1659489 A1    5/2006
(Continued)

OTHER PUBLICATIONS

Kazuo Tanie; Humanoid Robot and its Application Possibility; IEEE; pp. 213-214; retrieved on Jul. 19, 2019 (Year: 2003).*

(Continued)

*Primary Examiner* — Geoffrey R St Leger
*Assistant Examiner* — Cuong V Luu
(74) *Attorney, Agent, or Firm* — Venable LLP (57) ABSTRACT

A controller corresponding to production equipment, requiring upgrade can be selected automatically, thereby reduction in operating rate can be reduced. When software is upgraded, version upgrade software relating to a predetermined action description and version information are transferred to a controller management apparatus (S1). A version change determination unit selects a controller including the predetermined action description described in the version information (S2 and S3). The selected controller downloads the new version of software to change the software (S4 and S5) after stopping operation of the production equipment. On the other hand, a controller not selected does not download the software, and the operation of the production equipment is not stopped.

14 Claims, 6 Drawing Sheets

(51) Int. Cl.
*G05B 19/05* (2006.01)
*G05B 19/418* (2006.01)
*G06F 8/71* (2018.01)

(52) U.S. Cl.
CPC ......... *G05B 19/41845* (2013.01); *G06F 8/71* (2013.01); *G05B 2219/25229* (2013.01); *Y02P 90/12* (2015.11); *Y02P 90/14* (2015.11); *Y02P 90/16* (2015.11); *Y02P 90/18* (2015.11)

(56) References Cited

U.S. PATENT DOCUMENTS

| | | | | |
|---|---|---|---|---|
| 7,673,148 | B2* | 3/2010 | Zou | G06F 8/61 380/201 |
| 7,853,336 | B2* | 12/2010 | Grgic | G05B 19/042 700/11 |
| 7,865,907 | B2* | 1/2011 | Opheim | G06F 8/65 700/9 |
| 7,873,430 | B1* | 1/2011 | Sprecher | G06Q 10/06 700/100 |
| 8,255,898 | B2 | 8/2012 | Nakano et al. | |
| 9,217,998 | B2* | 12/2015 | Plache | G05B 19/4188 |
| 2006/0130073 | A1 | 6/2006 | Faist et al. | |
| 2006/0178757 | A1 | 8/2006 | Grgic et al. | |
| 2008/0184151 | A1* | 7/2008 | Agarwal | G06F 8/65 715/772 |
| 2008/0189693 | A1 | 8/2008 | Pathak | |
| 2008/0208365 | A1* | 8/2008 | Grgic | G05B 19/042 700/2 |
| 2009/0307678 | A1 | 12/2009 | Wu | |
| 2009/0328027 | A1 | 12/2009 | Tsuchiya et al. | |
| 2010/0131084 | A1* | 5/2010 | Van Camp | G06F 8/65 700/86 |
| 2011/0022192 | A1* | 1/2011 | Plache | G05B 19/4188 700/28 |
| 2011/0023021 | A1 | 1/2011 | Miyazaki | |
| 2012/0117576 | A1* | 5/2012 | Lam | G06Q 30/0251 719/328 |

FOREIGN PATENT DOCUMENTS

| | | |
|---|---|---|
| EP | 2189900 A1 | 5/2010 |
| JP | H08-249163 A | 9/1996 |
| JP | H08-263125 A | 10/1996 |
| WO | 2005/033934 A2 | 4/2005 |

OTHER PUBLICATIONS

Dong Jin Seo et al.; Development of Autonomous Navigation System for an Indoor Service Robot Application; ICCAS; pp. 204-206; retrieved on Jul. 19, 2019 (Year: 2013).*
Frederico Santos et al.; A real time distributed software infrastructure for cooperating mobile autonomous robots; IEEE; 16 pages; retrieved on Jul. 19, 2019 (Year: 2009).*
Barbara Alvare et al.; Timing analysis of a generic robot teleoperationsoftware architecture; Elsevier; pp. 409-416; retrieved on Jul. 19, 2019 (Year: 1998).*
International Search Report in corresponding PCT/JP2012/007706 dated Jun. 19, 2013.
Lorenzo Bettini et al.; Software Update via Mobile Agent Based Programming; 2002 ACM; pp. 32-36; <http://dl.acm.org/citation.cfm?id=508800>.
Janghoon Lyu et al.; A Procedure-Based Dynamic Software Update; 2001 IEEE; pp. 271-280; <http://ieeexplore.ieee.org/stamp/stamp.jsp?arnumber=941412>.
Meik Felser et al.; Dynamic Software Update of Resource-Constrained Distributed Embedded Systems; 2007 Springer; pp. 387-400; <http://download.springer.com/static/pdf/407/chp%253A10.1007%252F978-0-387-72258-0_33.pdf?>.
Gabrielle Anderson et al.; Dynamic Software Update for Message Passing Programs; 2012 Springer; pp. 207-222; <http://link.springer.com/chapter/10.1007/978-3-642-35182-2_15>.
Christopher M. Hayden et al.; A Study of Dynamic Software Update Quiescence for Multithreaded Programs; 2012 ACM; pp. 6-10; <http://dl.acm.org/citation.cfm?id=2664352>.
Valerio Panzica La Manna ; Dynamic Software Update for Component-based Distributed Systems; 2011 ACM; 8 pages; <http://dl.acm.org/citation.cfm?id=2000294>.
Alex Owen-Hill; What is the Best Programming Language for Robotics; 2016 Alex Owen-Hill; 14 pages; <http://blog.robotiq.com/what-is-the-best-programming-language-for-robotics>.

* cited by examiner

SOFTWARE NAME: ROBOT_CONTROLLER
VERSION: 00.01.00
DATE: 2010/11/01
COMPANY NAME: ROBO
....
VERSION UPGRADE INFORMATION:
ALL FUNCTIONS OR SAFETY: ×
COMMAND: PMOV, CMOV,......;

Job: MOVE_STRAIGHT
....
Main {
....
PMOV(A,B)
....
}

SOFTWARE NAME: ROBOT_CONTROLLER
VERSION: 00.01.00
DATE: 2010/11/01
COMPANY NAME: ROBO
. . . .
VERSION UPGRADE INFORMATION:
ALL FUNCTIONS OR SAFETY: ×
COMMAND: PMOV, CMOV, ....

Job: MOVE_STRAIGHT
. . . . Main { . . . . MOV(A,B) . . . . {

SOFTWARE NAME: ROBOT_CONTROLLER
VERSION: 00.01.00
DATE: 2010/11/01
COMPANY NAME: ROBO
. . . .
VERSION UPGRADE INFORMATION:
ALL FUNCTIONS OR SAFETY: O
COMMAND: PMOV, CMOV,....

Job: MOVE_STRAIGHT
. . . .
Main { . . . .
PMOV(A,B)
. . . .

SELECTIVE SOFTWARE DISTRIBUTION FOR AN INDUSTRIAL PLANT

The present application is a continuation of U.S. application Ser. No. 14/355,228, filed on Apr. 30, 2014, which is a national phase entry of PCT/JP2012/007706, filed on Nov. 30, 2012, which claims the benefit of JP 2011-272292, filed Dec. 13, 2011, the entire disclosure of each of which is incorporated by reference herein.

TECHNICAL FIELD

The present invention relates to a production system including a plurality of controllers that control a plurality of pieces of production equipment, respectively, and a controller management apparatus that manages the plurality of controllers, and particularly relates to upgrade of a version of software for a controller corresponding to production equipment.

BACKGROUND ART

Software incorporated into a controller corresponding to production equipment has to be upgraded due to detected bugs or for improvement of functions and performance. Since such software for a controller corresponding to production equipment is installed by a maker of the controller before shipment, the upgrade has to be performed typically by the maker, a dealer company or the like.

Since manpower and cost for operation are required for every upgrade, it is known that the upgrade of a plurality of controllers corresponding to production equipment is performed via a network (see PTL 1, for example). In the structure described in this PTL 1, however, a user judges whether upgrade is to be performed or not.

Meanwhile another proposed technique is to determine automatically the necessity for upgrade of software for equipment connected to a network by using version information (see PTL 2). In the structure described in this PTL 2, the determination criterion on the necessity for upgrade is based on whether the distributed software is the newest version or not.

CITATION LIST

Patent Literature

PTL 1: Japanese Patent Application Laid-Open No. H08-263125
PTL 2: Japanese Patent Application Laid-Open No. H08-249163

SUMMARY OF INVENTION

Technical Problem

Upgrade of software for controllers corresponding to production equipment cannot be performed during operation of the production equipment. Therefore when software for controllers corresponding to production equipment is to be upgraded during operation of a production line, the operation of production equipment has to be stopped. This means that, in the structure of the above PTL 2, when the version of the software for controllers of all pieces of production equipment is older than the version distributed, the all pieces of production equipment has to be stopped for upgrading.

In another case, the version of new software to be distributed may cover a function that specific production equipment in the production line or a specific line of a plurality of production lines does not use. Even in such a case, in the structure described in the above PTL 2, software for controllers of all pieces of production equipment will be uniformly upgraded when the new version of software is distributed. As a result, the operation of the production equipment or the production line that does not need to be upgraded also is stopped, thus leading the possibility of significant reduction in operating rate.

Since an operating rate is important in production lines, the reduction in operating rate is desirably minimized. To this end, a user may select a controller corresponding to production equipment for upgrading. However, it is not easy for a user to select a controller corresponding to production equipment that is to be upgraded, such an operation is desirably automatically performed.

In view of such a circumstance, it is an object of the present invention to provide a structure enabling automatic selection of a controller corresponding to production equipment that needs to be upgraded, thus suppressing reduction in operating rate.

Solution to Problem

A production system of the present invention includes: a plurality of controllers that control a plurality of pieces of production equipment, respectively; and a controller management apparatus that manages the plurality of controllers. The controller management apparatus includes: acquisition means that acquires new version of software relating to a specific action description, transmitted externally; selection means that selects a controller requiring upgrade from among the plurality of controllers; and a transmission part that transmits the new version of software to the controller selected by the selection means. The plurality of controllers each includes: storing means that stores software to control the production equipment on a basis of an action description to operate the production equipment; change means that changes software stored in the storing means; and a reception part that receives the new version of software transmitted from the transmission part. The selection means selects, from among the plurality of controllers, a controller including the specific action description as the controller requiring upgrade.

Advantageous Effects of Invention

According to the present invention, selection means in a controller management apparatus selects a controller corresponding to production equipment requiring upgrade on the basis of an action description of the production equipment, and therefore the controller corresponding to the production equipment requiring upgrade can be selected automatically. Further, since production equipment not requiring upgrade is not stopped, reduction in operating rate can be suppressed.

Further features of the present invention will become apparent from the following description of exemplary embodiments with reference to the attached drawings.

DESCRIPTION OF EMBODIMENTS

Preferred embodiments of the present invention will now be described in detail in accordance with the accompanying drawings.

Figure 1:
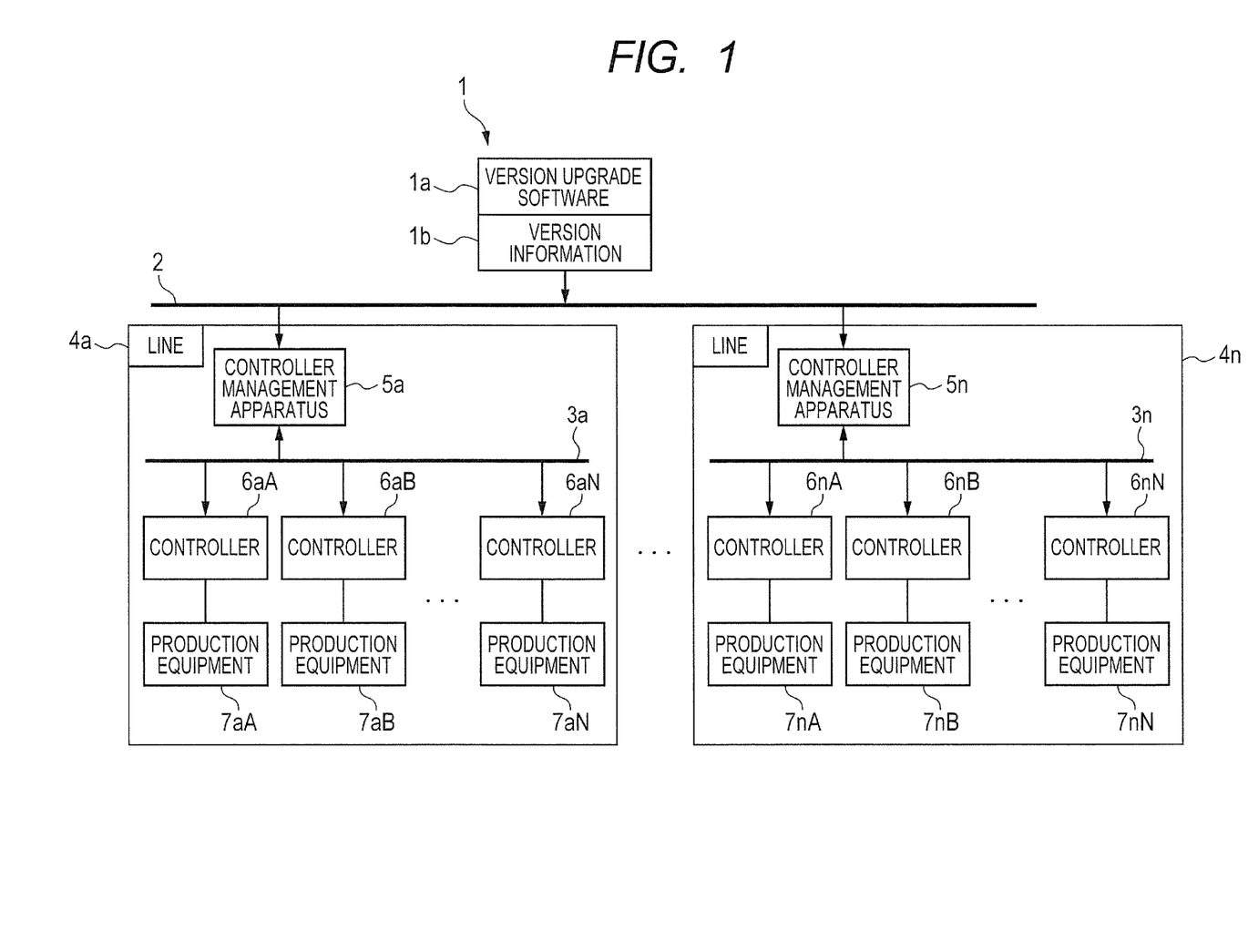
FIG. 1 is a block diagram schematically illustrating the configuration of a production system according to an embodiment of the present invention.

Referring to FIG. 1 to FIG. 6B, one embodiment of the present invention is described below. To begin with, a production system of the present embodiment is briefly described, with reference to FIG. 1. FIG. 1 illustrates the structure of managing a version of software for production lines 4a to 4n each including a plurality of pieces of production equipment. In the following description, a to n (other than 1a and 1b) attached to a numeral of referential marks indicate that there are a plurality of elements for the structure having the numeral, and A to N attached after a to n indicate that there are a plurality of elements for each structure having a to n.

Each of the production lines 4a to 4n is connected to a network 2. Each of the production lines 4a to 4n includes one controller management apparatus 5a to 5n, one or more controllers 6aA to 6nN and one or more pieces of production equipment 7aA to 7nN.

The controller management apparatuses 5a to 5n and the controllers 6aA to 6nN are connected to networks 3a to 3n, respectively. That is, a plurality of controllers is connected to one controller management apparatus provided for each production line. Then, the production equipment 7aA to 7nN is connected in a one-to-one correspondence with the controllers 6aA to 6nN.

In the production lines 4a to 4n, different products, different components of the same product or the like are produced by steps such as assembly, processing and examination. For instance, in production line 4a, product A is produced, and in production line 4b, product B is produced. Alternatively, the production lines 4a to 4n may be for different steps of the same product or component. In any case, the production lines 4a to 4n include a plurality of pieces of production equipment 7aA to 7nN for performing each step.

The production equipment 7aA to 7nN may be equipment necessary for assembly, examination or the like in production steps for, such as a robot arm, a robot hand, a NC, an air cylinder, a hydraulic cylinder and a vision sensor. All pieces of the production equipment 7aA to 7nN may be the same. They may be the same for each production line or may be partially different even in the same production line. The production equipment 7aA to 7nN is controlled by the controllers 6aA to 6nN, respectively.

The controllers 6aA to 6nN interpret action descriptions for operating their corresponding production equipment 7aA to 7nN and have software for controlling the production equipment 7aA to 7nN. As for this software, all of the controllers 6aA to 6nN use the same type, and the same version of the controllers naturally use the same software. Herein, even with the same software, the production equipment 7aA to 7nN can be controlled in different manners when their action descriptions are different.

The action description, such as a robot language or a sequencer program, explicitly describes the action of production equipment, and in other words it is an operational standard for each piece of production equipment. Herein, although the action description basically is different for each of the controllers 6aA to 6nN, two or more of the controllers 6aA to 6nN may use the same action description.

In such a production system of the present embodiment, a central management apparatus 1 such as an apparatus managing the lines of a factory as a whole or an apparatus managing a plurality of production lines distributes version upgrade software 1a for the controllers 6aA to 6nN. The version upgrade software 1a is distributed to the controller management apparatuses 5a to 5n in the production lines 4a to 4n via the network 2, together with version information 1b indicating the number of the version, the corresponding action description and the like.

Herein, when new version of software for the controllers 6aA to 6nN is distributed to the controller management apparatuses 5a to 5n, upgrade may not be necessary for some pieces of the production equipment 7aA to 7nN depending on their action descriptions. For instance, it is assumed that each piece of production equipment includes a robot arm and the upgrade this time relates to the straightness of the robot arm. In this case, when there is a controller of which the action description does not describe (include) an action description relating to the straight action of a robot arm among action descriptions interpreted by the controllers 6aA to 6nN, the upgrade is not necessary for such a controller.

Then, in the present embodiment, when new version of software for a controller is distributed, the version information 1b indicating the corresponding action description (a predetermined (specific) action description) to be upgraded is transferred at the same time. More specifically, the version information 1b includes basic information on the new version of software described therein, such as the software name and the version number. In the present embodiment, in addition to this basic information, the version information 1b describes information indicating that the new version distributed this time relates to which command (action description) among the commands represented by e.g. a robot language, used for production equipment. The version information 1b further describes information on whether it relates to all functions or safety or not irrespective of commands.

Figure 2:
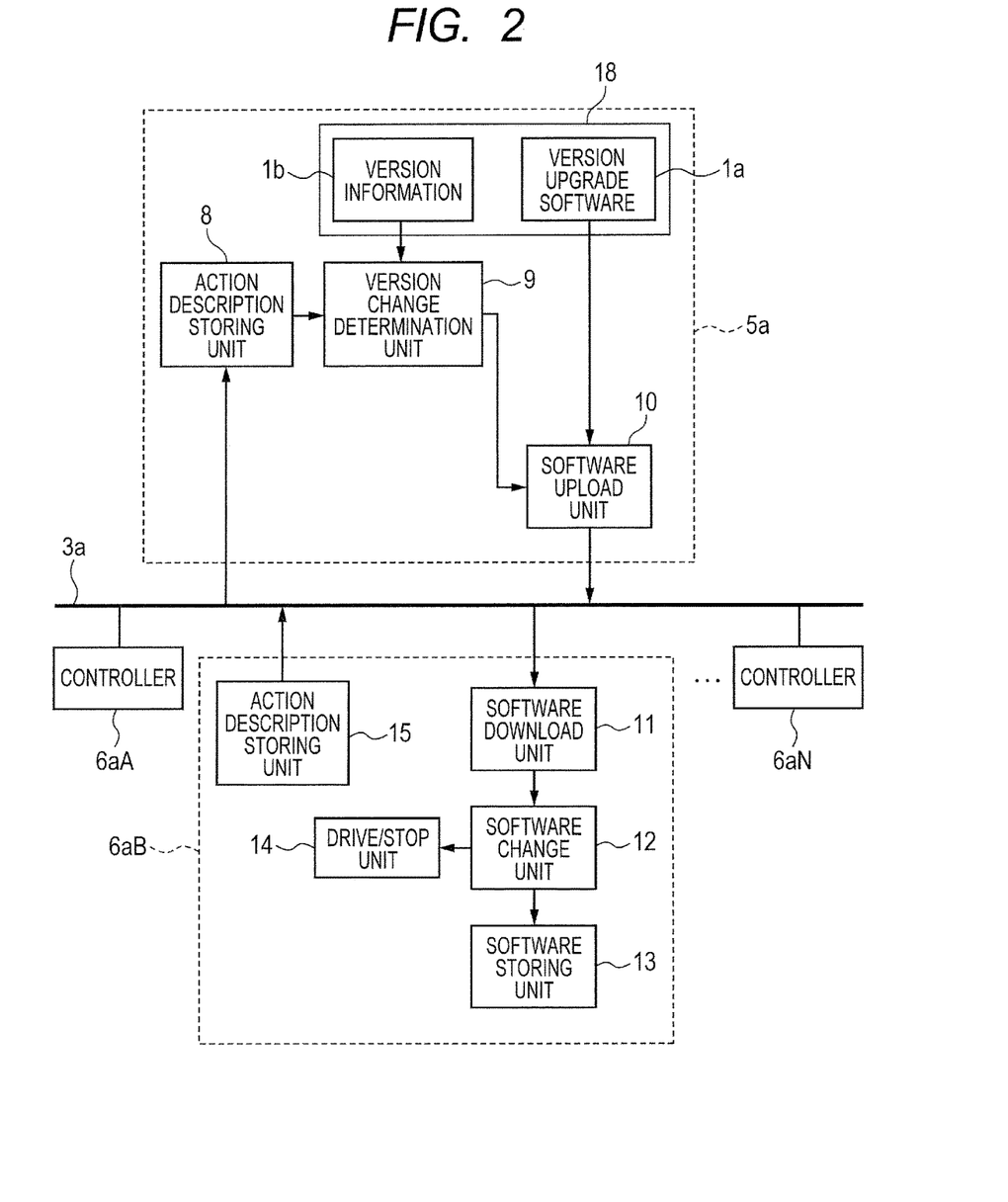
FIG. 2 is a block diagram illustrating the internal configurations of a controller management apparatus and a controller.

Referring to FIG. 2, upgrade of software in such a present embodiment is described below. Although FIG. 2 mainly describes the exchange between the controller 6aB and the controller management apparatus 5a in the production line 4a, the same goes for the relations with other controllers and further the relations in other production lines.

The controller management apparatus 5a includes an acquisition unit 18 as an acquisition means, a version change determination unit 9 as a selection means, a software upload unit 10 as a transmission part and an action description storing unit 8 that stores action descriptions of the controllers 6aA to 6nN. The acquisition unit 18 acquires new version of software relating to a predetermined action description that is sent externally (i.e., from the central management apparatus 1). In the present embodiment, the acquisition unit 18 acquires version upgrade software 1a and version information 1b.

The version change determination unit 9 selects a controller requiring upgrade from among the plurality of controllers 6aA to 6nN. That is, the version change determination unit 9 refers to the version information 1b among the information acquired by an acquisition unit 18 to determine which controller requires a version change.

To this end, in the present embodiment, the controller management apparatus 5a includes the action description storing unit 8 that stores action descriptions of the controllers 6aA to 6aN. The action description storing unit 8 further stores basic information such as the version number of each of the controllers 6aA to 6aN at that time. The specific method for determination is described later.

The software upload unit 10 transmits the new version of software to the controller selected by the version change determination unit 9. Herein, this transmission may be performed automatically or may be performed manually by a user. In this embodiment, transmission is performed automatically.

The plurality of controllers 6aA to 6aN each include a software storing unit 13 as a storing means, a software change unit 12 as a change means and a software download unit 11 as a reception part. Each controller 6aA to 6aN further includes an action description storing unit (command storing unit) 15 that stores an action description and a drive/stop unit 14 that instructs drive and stop of the production equipment controlled by the controller.

The software storing unit 13 stores software that controls the production equipment as a control target of the controller on the basis of the action description for operating the production equipment. In other words, the software stored in the software storing unit 13 controls production equipment as a target on the basis of the action description stored in the action description storing unit 15.

The software change unit 12 changes the software stored in the software storing unit 13. That is, the software change unit 12 rewrites the software stored in the software storing unit 13 with upgraded software. This change (rewrite) may be performed automatically or may be performed manually by a user. In the present embodiment, the rewrite is performed automatically. During this rewriting, the production equipment cannot be operated, and so during this rewriting, the drive/stop unit 14 stops the operation of the production equipment as a control target of the controller.

The software download unit 11 receives new version of software transmitted (uploaded) from the software upload unit 10. That is, when the version change determination unit 9 determines that the controller is to be upgraded, the software download unit 11 downloads the new version of software via the network 3a.

Figure 3:
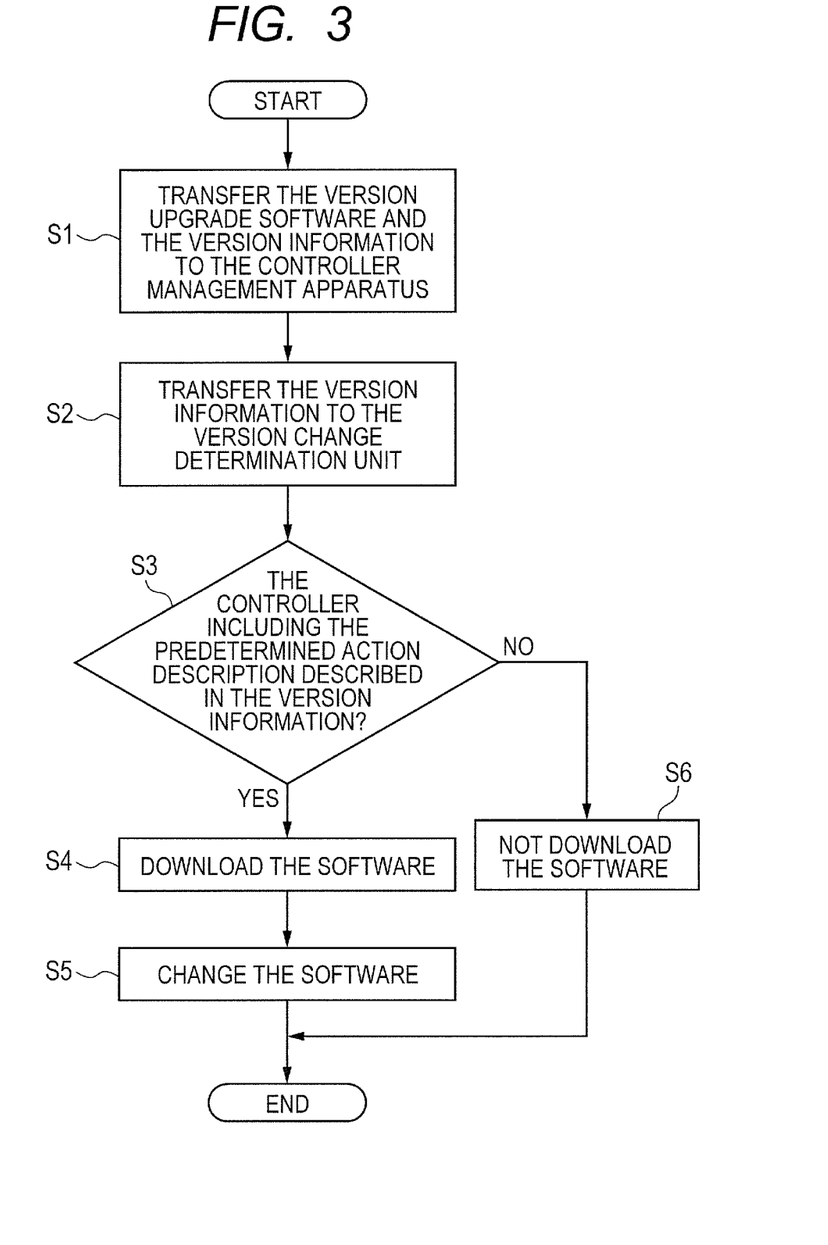
FIG. 3 is a flowchart illustrating the flow of control in the present embodiment.

Control performed for upgrading of a controller is illustrated in FIG. 3. Firstly, the new version of software (version upgrade software 1a) and the version information 1b are transferred to the controller management apparatus 5a (S1). That is, the acquisition unit 18 acquires the new version of software from the central management apparatus 1.

The controller management apparatus 5a transfers the version upgrade software 1a for the controller to the software upload unit 10, and transfers the version information 1b to the version change determination unit 9 (S2).

The version change determination unit 9 makes a determination on the upgrade on the basis of the version upgrade information described in the version information 1b and the action descriptions of the controllers 6aA to 6aN stored beforehand in the action description storing unit 15. That is, the version change determination unit 9 selects a controller in which the action description storing unit 15 stores a predetermined action description as a controller requiring upgrade from among the plurality of controllers (S3). Herein, when the new version of software is targeted at a plurality of predetermined action descriptions, the controller in which the action description storing unit 15 stores any one of the predetermined action descriptions will be a target of the upgrade.

Referring to FIG. 4A to FIG. 6B, this point is described more specifically below. Herein, version information 16a to 16c in FIG. 4A to FIG. 6B shows exemplary descriptions of the version information 1b. Action descriptions 17a to 17c in FIG. 4A to FIG. 6B shows one exemplary description among the action descriptions that are stored beforehand in the action description storing unit 15 and are used by the controllers 6aA to 6aN.

Figure 4A:
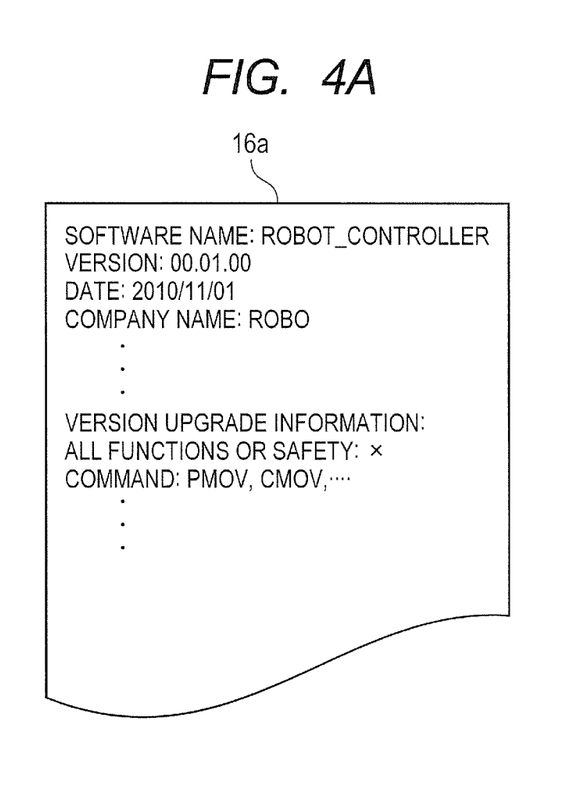
FIG. 4A illustrates information on new version of software.
Figure 5A:
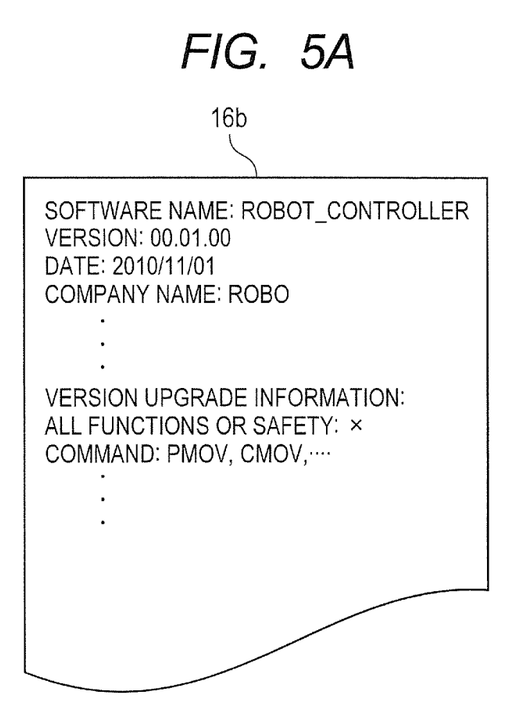
FIG. 5A illustrates information on new version of software.
Figure 6A:
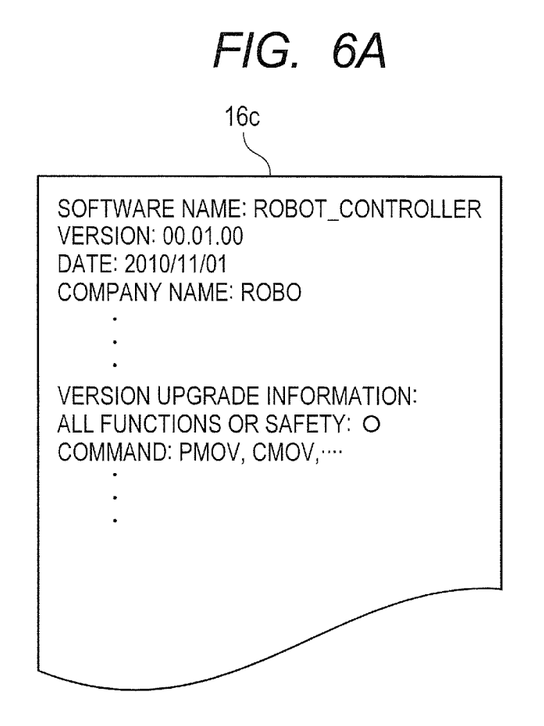
FIG. 6A illustrates information on new version of software relating to all functions or safety.

These two exemplary descriptions deal with the case where the production equipment includes a robot arm, and the upgrade relates to the straightness of the robot arm. When the command of the action description to be used for straight action of a robot arm is "PMOV", then the version upgrade information describes "PMOV" as in the version information 16a to 16c.

Figure 4B:
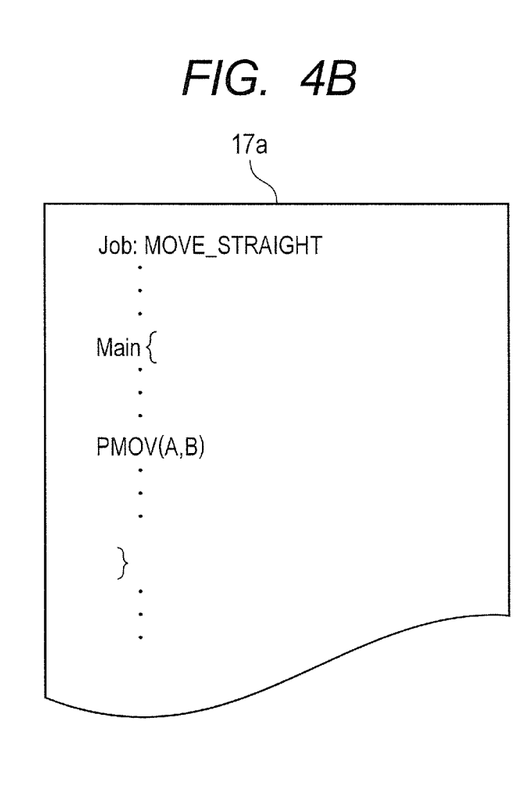
FIG. 4B illustrates an action description of a controller including the action description in the version information.

In FIGS. 4A and 4B, an x-mark is put at the item on all functions or safety of the version upgrade information of the version information 16a, and the command "PMOV" among the commands of a command group described in the item of commands thereof is described in the action description 17a as a predetermined action description. That is, as the version upgrade information of the version information 16a, "PMOV" and the like and not one relating to all functions or safety is described as a predetermined action description. Meanwhile, the action description 17a of the controller stored beforehand in the action description storing unit 15 includes "PMOV". Therefore, in the case of FIGS. 4A and 4B, the version change determination unit 9 selects the controller as a controller requiring upgrade.

Figure 5B:
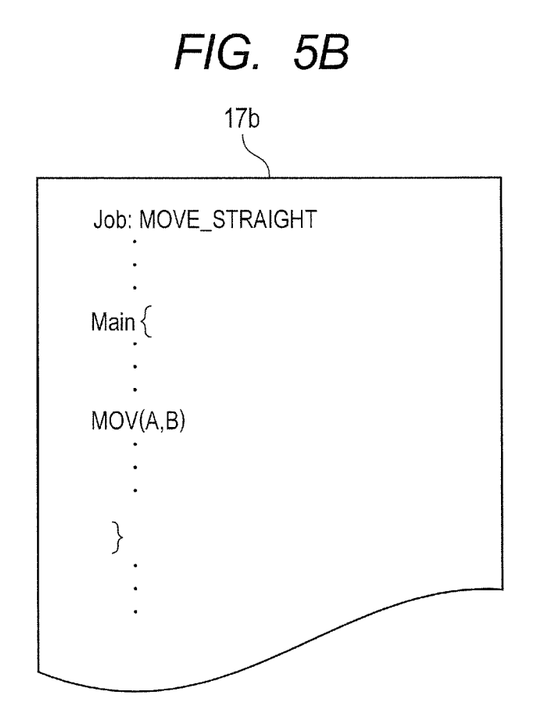
FIG. 5B illustrates an action description of a controller not including the action description in the version information.

In FIGS. 5A and 5B, an x-mark is put at the item on all functions or safety of the version upgrade information of the version information 16b, and any command among the commands of a command group described in the item of commands thereof is not described in the action description 17b. That is, as the version upgrade information of the version information 16b, "PMOV" and the like and not one relating to all functions or safety is described as a predetermined action description. Meanwhile, although the action description 17b of the controller stored beforehand in the action description storing unit 15 includes "MOV", the predetermined action description "PMOV" and the like described in the version information 16b are not included in the action description 17b of the controller. Therefore, in the case of FIGS. 5A and 5B, the version change determination unit 9 determines the controller as a controller not requiring version upgrade.

Figure 6B:
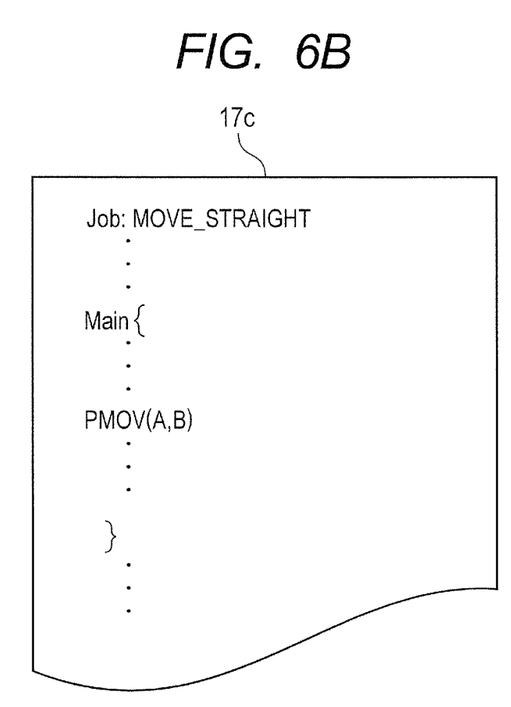
FIG. 6B illustrates an action description of a controller.

In FIGS. 6A and 6B, a circle-mark is put at the item on all functions or safety of the version upgrade information of the version information 16c. That is, the version upgrade information of the version information 16c relates to all functions or safety. Therefore in the case of FIGS. 6A and 6B, the version change determination unit 9 determines that all controllers have to be upgraded irrespective of the action description 17c of the controller stored beforehand in the action description storing unit 15.

Herein the version change determination unit 9 selects, from among the plurality of controllers, a controller having software in a version older than the version acquired by the acquisition unit 18 as a controller requiring upgrade. That is, the version change determination unit 9 selects, as a controller requiring upgrade, a controller having software in a version older than the new version and including the predetermined action description of the new version.

The software upload unit 10 uploads software to the controller as a target of upgrade based on the determination by the version change determination unit 9 as described above. Then the software download unit 11 downloads the software uploaded by the software upload unit 10 (S4).

When the software download unit 11 downloads the software, firstly the software change unit 12 issues a stop request to the drive/stop unit 14 in the controller, and the drive/stop unit 14 stops the operation of the production equipment. After the production equipment is stopped, the software change unit 12 changes the software stored in the software storing unit 13 (S5). That is, the software is rewritten with the new version of software. After the change, the software change unit 12 issues an operation request to the drive/stop unit 14 and the drive/stop unit 14 operates the production equipment.

On the other hand, as for a controller that is determined as not requiring upgrade at S3, the new version of software is not downloaded (S6). Therefore such a controller continuously uses the software not upgraded. In this case, the operation of the production equipment also is not stopped.

In the case of the present embodiment, the version change determination unit 9 of each of the controller management apparatuses 5a to 5n selects a controller corresponding to production equipment requiring upgrade on the basis of the action description of the production equipment. Accordingly, a controller corresponding to production equipment requiring upgrade can be selected automatically. Further, since production equipment not requiring upgrade is not stopped, reduction in operating rate can be suppressed.

For instance, there is a case where the new version of software to be distributed relates to a function that is not used in specific production equipment in a production line or in a specific line of a plurality of production lines. In this case, the operation of such a specific production equipment or production line is not stopped, and therefore reduction in operating rate can be suppressed.

As one example of suppressing reduction in operating rate by specific production equipment being not stopped, there is case where a time period when the specific production equipment is in a stand-by state exists in the flow of the operation of a production line, for example. In this case, the specific production equipment requiring upgrade can be upgraded during the stand-by state, and other production equipment not requiring upgrade can be continuously operated, thereby reduction in operating rate can be suppressed.

Especially production equipment such as a robot often has an extremely long action description, and so it takes an enormous time for a user in a factory to judge on the upgrade, thus increasing operating cost. Further such a manual judgment often leads to a human error. On the other hand, in the present embodiment, there is no need for a user to judge a controller requiring upgrade for the upgrade this time, and therefore operating cost and human errors can be reduced.

Other Embodiments

In the above embodiment, when upgrade is performed during operation of production equipment, upgrade is automatically performed to a controller as a target of the upgrade on the basis of the determination by the version change determination unit 9. Instead, the version change determination unit 9 simply determines whether the upgrade is necessary or not, and a user may finally judge as to whether the upgrade is to be performed or not. For instance, in the case where the production equipment requiring upgrade is in a stand-by state, the user may perform upgrade manually. At this time, the new version of software may be automatically downloaded up to the controller corresponding to the production equipment requiring upgrade, and the change of the software may be performed manually.

Further, a controller (all controllers determined as not requiring upgrade) not upgraded during the operation of the production equipment may be upgraded after the completion of operation. That is, even in the case of software not including an action description relating to the version upgrade software distributed during operation and still being an old version, upgrade may be performed during non-operation such as after the completion of operation, for example, as a precaution. If the software is upgraded during non-operation of the production equipment, the operating rate will not be reduced. In this case, however, the controller management apparatuses 5a to 5n have to store the controller determined as not requiring upgrade by the version change determination unit 9.

Further, when an action description is to be switched during operation of production equipment, there is a case where the version change determination unit 9 determines that a controller corresponding to the production equipment does not require upgrade for the action description before the switching but determines that the controller requires upgrade after the switching. For instance, there is a case where a product to be produced is switched from product A to product B during the operation of a production line. In this case, the action description of the controller corresponding to the production equipment may have to be changed (switched), and the action description may include a predetermined action description relating to the version upgrade software after the switching. Then, in such a case, the version change determination unit 9 may determine whether upgrade is necessary or not again about the switched action description.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2011-272292, filed Dec. 13, 2011, which is hereby incorporated by reference herein in its entirety.

REFERENCE SIGNS LIST 1 central management apparatus
4a to 4n production line
5a to 5n controller management apparatus
6aA to 6nN controller
7aA to 7nN production equipment
8 action description storing unit
9 version change determination unit (selection means)
10 software upload unit (transmission part)
11 software download unit (reception part)
12 software change unit (change means)
13 software storing unit (storing means)
14 drive/stop unit
15 action description storing unit 16a to 16c version information
17a to 17c action description
18 acquisition unit (acquisition means)

The invention claimed is:

1. A production system, comprising:
a plurality of pieces of production equipment arranged to operate in a predetermined operational sequence;
a plurality of controllers provided so as to correspond to each of the plurality of pieces of production equipment, each of the plurality of controllers configured to store an action description information including an action command defining the operational sequence and software configured to control the production equipment corresponding to each controller based on the action description information; and
a controller management apparatus configured to manage upgrade of a version of the software of the plurality of controllers,
wherein the controller management apparatus is configured to select a controller storing an action description information, which includes an action command same as an action command relating to a new version of the software, among the plurality of controllers, based on the action description information stored by the controller to perform the upgrade of the version of the software of the selected controller, and
wherein the controller management apparatus is configured to not select a controller storing an action description information, which does not include the action command same as the action command relating to the new version of the software, among the plurality of controllers, based on the action description information stored by the controller, and not perform the upgrade of the version of the software of the controller which is not selected.

2. The production system according to claim 1,
wherein the plurality of controllers are further configured to:
when the upgrade of the version of the software of the selected controller is performed, stop the production equipment corresponding to the selected controller; and
not stop the production equipment corresponding to the controller which is not selected.

3. The production system according to claim 2,
wherein the production equipment is a robot apparatus, and
wherein the action description information is a robot language that explicitly describes an action of the robot apparatus.

4. A method for producing a product by the production system according to claim 1.

5. A controller management apparatus for managing upgrade of a version of software stored by each of a plurality of controllers, the each of which is provided so as to correspond to each of a plurality of pieces of production equipment arranged to operate in a predetermined operational sequence, the software configured to control the production equipment corresponding to the controller based on an action description information which includes an action command defining the operational sequence,
wherein the controller management apparatus is configured to select a controller storing an action description information, which includes an action command same as an action command relating to a new version of the software, among the plurality of controllers, based on the action description information stored by the controller to perform the upgrade of the version of the software of the selected controller, and
wherein the controller management apparatus is configured to not select a controller storing an action description information, which does not include the action command same as the action command relating to the new version of the software, among the plurality of controllers, based on the action description information stored by the controller, and not perform the upgrade of the version of the software of the controller which is not selected.

6. The controller management apparatus according to claim 5, wherein the plurality of controllers are further configured to:
when the upgrade of the version of the software of the selected controller is performed, stop the production equipment corresponding to the selected controller; and
not stop the production equipment corresponding to the controller which is not selected.

7. The controller management apparatus according to claim 6,
wherein the controller managed by the controller management apparatus is configured to control a robot apparatus as the production equipment, and
wherein the action description information is a robot language that explicitly describes an action of the robot apparatus.

8. A controller provided so as to correspond to each of a plurality of pieces of production equipment arranged to operate in predetermined operational sequence, the controller configured to store an action description information including an action command defining the operational sequence and software configured to control the production equipment corresponding to the controller based on the action description information,
wherein, in upgrade of a version of the software of the controller, the controller is selected based on the action description information stored by the controller and the upgrade of the version of the software of the selected controller is performed, if the controller stores an action description information, which includes an action command same as an action command relating to a new version of the software, and
wherein the controller is not selected based on the action description information stored by the controller and the upgrade of the version of the software of the controller which is not selected is not performed, if the controller stores an action description information, which does not include the action command same as the action command relating to the new version of the software.

9. The controller according to claim 8, further configured to:
when the controller is selected and the upgrade of the software of the selected controller is performed, stop the production equipment corresponding to the selected controller; and
when the controller is not selected and the upgrade of the software of the controller which is not selected is not performed, not stop the production equipment corresponding to the controller which is not selected.

10. The controller according to claim 8, wherein the controller is selected and is not selected by a controller management apparatus configured to manage upgrade of the version of the software of the controller.

11. A version upgrade method for performing upgrade of a version of software stored by each of a plurality of controllers, each of which is provided so as to correspond to each of a plurality of pieces of production equipment arranged to operate in a predetermined operational sequence, the software configured to control the production equipment corresponding to the controller based on an action description information including an action command defining the operational sequence, the version upgrade method comprising:

selecting a controller storing an action description information, which includes an action command same as an action command relating to a new version of the software, among the plurality of controllers, based on the action description information stored by the controller to perform the upgrade of the version of the software of the selected controller, and     not selecting a controller storing an action description information, which does not include the action command same as the action command relating to the new version of the software, among the plurality of controllers, based on the action description information stored by the controller, and not performing the upgrade of the version of the software of the controller which is not selected.

12. The version upgrade method according to claim 11, further comprising:

when the upgrade of the version of the software of the selected controller is performed, stopping the production equipment corresponding to the selected controller; and     not stopping the production equipment corresponding to the controller which is not selected.

13. The version upgrade method according to claim 12, wherein the production equipment is a robot apparatus, and     wherein the action description information is a robot language that explicitly describes an action of the robot apparatus.

14. A non-transitory computer-readable medium having stored thereon a program for causing, when being executed by a computer, the computer to perform the version upgrade method of claim 11.

\* \* \* \* \*